(12) United States Patent
Yakovleva et al.

(10) Patent No.: US 10,909,645 B1
(45) Date of Patent: Feb. 2, 2021

(54) SYSTEM FOR DELIVERING AND RELINQUISHING MEMORIES

(71) Applicants: Inessa Yakovleva, Odessa, FL (US); Mark Gaker, Odessa, FL (US)

(72) Inventors: Inessa Yakovleva, Odessa, FL (US); Mark Gaker, Odessa, FL (US)

(*) Notice: Subject to any disclaimer, the term of this patent is extended or adjusted under 35 U.S.C. 154(b) by 0 days.

(21) Appl. No.: 16/791,411

(22) Filed: Feb. 14, 2020

Related U.S. Application Data

(63) Continuation-in-part of application No. 16/521,658, filed on Jul. 25, 2019, now Pat. No. 10,603,238.

(51) Int. Cl.
*G06Q 50/18* (2012.01)
*A61G 17/08* (2006.01)
*G06Q 10/08* (2012.01)

(52) U.S. Cl.
CPC .......... *G06Q 50/186* (2013.01); *A61G 17/08* (2013.01); *G06Q 10/0832* (2013.01)

(58) Field of Classification Search
CPC ...... A61G 17/08; A61G 17/007; A44C 25/04; B65D 59/04; B42D 15/04; B42D 15/042; B42D 15/047; G06Q 50/186; G06Q 10/0832
USPC .......... 27/1; 229/93, 92.8; 63/1.14; 206/226; 40/124.5, 124.06
See application file for complete search history.

(56) References Cited

U.S. PATENT DOCUMENTS

| | | | |
|---|---|---|---|
| 262,080 A | 8/1882 | McLeary | |
| 477,217 A | 6/1892 | McCoy | |
| 601,869 A | 4/1898 | Busch | |
| 718,562 A | 1/1903 | Blackinton | |
| 1,032,282 A * | 7/1912 | Hay | B65D 3/04 229/93 |
| 1,112,640 A | 10/1914 | Mix | |
| 1,457,770 A * | 6/1923 | Dodge | B65D 65/04 229/92 |
| 1,459,783 A * | 6/1923 | Loufek | B65D 3/04 229/125.22 |
| 1,473,393 A * | 11/1923 | Albertoni | B65D 3/20 229/93 |
| 1,814,467 A | 7/1931 | Cedar | |
| 2,037,504 A * | 4/1936 | Drake | B65D 27/00 229/92.9 |
| 2,128,644 A | 8/1938 | Gitter | |
| 2,222,366 A * | 11/1940 | Glass | B65G 51/06 229/93 |
| 2,728,450 A * | 12/1955 | Haire | B65D 75/06 206/459.5 |
| 2,756,924 A * | 7/1956 | Abrahamson | B65D 59/04 229/93 |
| 2,827,309 A | 3/1958 | Fred | |
| 3,077,981 A * | 2/1963 | Gaspard | F21V 35/00 206/223 |
| 3,100,047 A * | 8/1963 | Wallace | B42D 15/047 206/215 |

(Continued)

*Primary Examiner* — William L Miller
(74) *Attorney, Agent, or Firm* — Larson & Larson, P.A.; Justin P. Miller; Frank Liebenow

(57) ABSTRACT

The system is a means of communicating between a user in a third-party, the third-party may be alive or deceased. In summary, the system is the recordation of a memory an apology or praise, memorialized in physical form, such as in a letter, the letter than stored in an item such as lock it and the item shared with a third party or carried by the user.

8 Claims, 11 Drawing Sheets

(56) References Cited

U.S. PATENT DOCUMENTS

| | | | |
|---|---|---|---|
| 4,353,379 A | 10/1982 | Castellanos | |
| 4,977,652 A | 12/1990 | Graham | |
| 5,193,360 A | 3/1993 | Lovegrove | |
| 5,208,957 A | 5/1993 | Hereford | |
| 5,611,124 A | 3/1997 | Biondo et al. | |
| 5,729,921 A | 3/1998 | Rojas | |
| 5,755,116 A | 5/1998 | Sparacino et al. | |
| 5,787,626 A | 8/1998 | Bingham et al. | |
| 5,815,897 A | 10/1998 | Longstreth | |
| 5,950,287 A | 9/1999 | Cacciatore et al. | |
| 6,237,837 B1 * | 5/2001 | Martin | B65D 27/04 229/307 |
| 6,557,750 B1 * | 5/2003 | Druse | B65D 59/04 206/37.1 |
| 7,467,444 B1 | 12/2008 | Johnson, Sr. | |
| 7,997,100 B2 | 8/2011 | Fossas | |
| 8,364,549 B2 | 1/2013 | Sell | |
| 8,397,944 B1 * | 3/2013 | Landes | B65D 43/0222 220/799 |
| 8,782,932 B2 * | 7/2014 | Rouzaud Giannetti | G09F 7/165 40/124.05 |
| 9,457,949 B1 * | 10/2016 | Hathaway, III | A61G 17/004 |
| 10,070,706 B2 | 9/2018 | Gobbato | |
| 10,165,733 B2 | 1/2019 | Lieberstein | |
| 2003/0182963 A1 | 10/2003 | Beatty | |
| 2005/0081561 A1 | 4/2005 | Eggleston | |
| 2005/0173504 A1 * | 8/2005 | Erdie | B65D 59/02 229/125.17 |
| 2007/0187290 A1 * | 8/2007 | Zimmerman | B65D 5/665 206/784 |
| 2012/0137549 A1 * | 6/2012 | Caszatt | E04H 13/003 40/124.5 |
| 2013/0105349 A1 * | 5/2013 | Lafler | B65D 59/02 206/457 |
| 2013/0153453 A1 * | 6/2013 | Simpson | G65D 59/04 206/389 |
| 2014/0041168 A1 * | 2/2014 | Giannetti born Rouzaud | A61G 17/08 27/1 |

* cited by examiner

SYSTEM FOR DELIVERING AND RELINQUISHING MEMORIES

RELATED APPLICATIONS

This application is a continuation-in-part of U.S. patent application Ser. No. 16/521,658 filed Jul. 25, 2019, titled System for delivering and relinquishing memories.

FIELD

This invention relates to the field of sharing memories and well-wishes and more particularly to a system for recording and passing memories, apologies, and praise to living or deceased friends or family members.

BACKGROUND

Sometimes it is too hard to say what needs to be said.

For example, it is not always possible to have important conversations while someone is still alive. Perhaps it is too difficult to share the memory, praise, or apology that is needed. Or the opportunity never arises, or death comes unexpectedly.

Alternatively, the other person may be alive, and there is an apology or praise that we have an opportunity to share, but doing so in a conversation is too stressful. For example, apologizing after an argument, or sharing praise.

When we are prevented from saying what we want or need to say, the unsaid things build up. The result is anxiety, regret, and a feeling of failure.

What is needed is a way of letting go of a memory, apologizing after an argument, or giving feedback to someone, it is impossible or difficult for us to do.

SUMMARY

The system is a means of communicating between a user and a third-party, the third-party alive or deceased. In summary, the system is the recordation of a memory, an apology, or praise, memorialized in physical form, such as in a letter, the letter then stored in a communication container, such as a locket, and the item shared with a third party or carried by the user. The act of writing a letter gives the user an opportunity to shift his or her perspective, creating space for self-evaluation and forgiveness.

In greater detail, the first step of the method is to wait until event occurs to the third-party. For example, something that prompts the sharing of a memory, apology, or praise, such as a death, an argument, or a celebration. A celebration may be a birthday party, the anniversary of an event, a wedding, or a baby shower. Or the celebration may be a holiday such as Christmas or Veteran's Day. The event affects both the user and a third-party, thus connecting the user and the third-party and creating a reason to share a memory, an apology, or praise.

Triggered by the event, the user writes a letter to the third-party. The letter is written on something physical, such as a piece of paper. The letter is preferably hand-written using pen or pencil.

The letter is then placed inside of a communication container. The communication container is a physical item that can hold a letter and optionally hold ashes.

As an optional modification of the above method, the user may order the communication container and associated supplies, such as letter stock and envelopes, from a supplier. At the time of the order, the user provides the supplier with information regarding the party who will receive the communication container. This allows the supplier to provide a shipping label to the user, which the user then uses after filling the communication container. The result is that the user is more likely to successfully complete the method and ship the communication container.

With the letter securely inside the communication container, the user then transfers the communication container.

As a variation on the above method, the third-party can be an animal, such as a pet. Pets are part of families just like humans, and thus their passing is as difficult as losing a family member. Thus, one may wish to write a letter, and include ashes, to remember a lost pet.

As an additional variation, the letters are pre-drafted and held by the supplier. The user can pre-draft the letters, or the user can provide the text of the letter or letters to the supplier, who then duplicates the text as needed. In addition to letters or text, the user provides a list of parties to receive the letters after the event has occurred. For example, death of the user. Or, an event that occurs to the third-party. For example, a birthday.

Upon occurrence of the event to the user or third-party, the letters, protected within their communication containers, are distributed to the third-parties on the pre-provided list. This allows the user to deliver a message after the event, such as death.

Or, the user can pre-draft multiple letters directed to different third-parties, the letters to be sent on multiple dates. For example, to arrive on the birthday of the third-party, after the death of the user.

The user can prepare all the letters and third-party information in advance, or a trusted friend or family member may be granted access to a portal through which third-party dates and addresses are editable.

By using the above method, there is always a chance to communicate feelings, thoughts, greetings, or praise to people we love, whether or not they have passed away. By being able to communicate in this way the user is freed from feelings of regret or negative emotions that may build up because of the inability to communicate.

Studies have shown that writing about stressful events, caused by events such as death or an argument, caused physical improvements. For example, decreases in inflammation and improved immune function.

Using the disclosed method allows one to write something for their loved ones to read after they are gone. Our relationships with people we love and care about should last even after we are no longer with them. A hand-written letter may help those left behind to overcome grievances and suffering by cheering them up and letting them know that we bless them with our love, and that it was nothing more important for us than seeing them smile and see more moments of joy even when we can only watch them from the skies.

The communication container can take many different forms. For example, keepsake jewelry such as a locket, a key chain, or other items that have the space to hold a letter and an optional ash compartment. Other embodiments include a flower pot into which the user may place a plant to add life to the stored memory.

Using this method, a user can write to their parent on Mother's Day or Father's Day, write to the son or daughter, or a girlfriend or boyfriend, and share something meaningful with a handwritten letter. The letter is held in its own compartment to avoid it being lost, and to indicate the value and meaning of the communication.

Hand-written communication is all the more critical in this time of instant messaging, email, and other digital communication. Such digital communication lacks the weight of a real letter.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
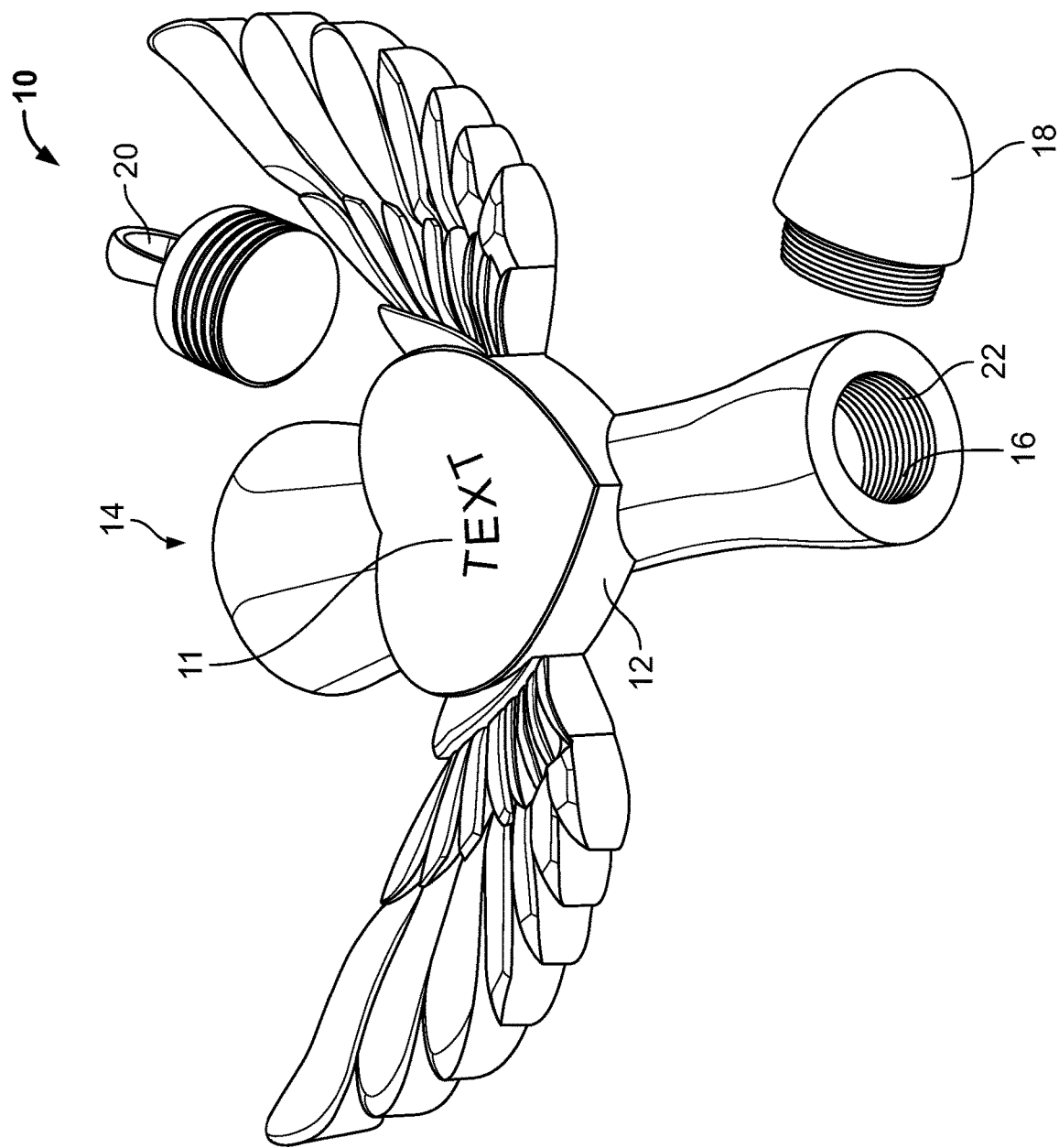
FIG. 1 illustrates a view of a first embodiment of a communication container.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a view of a first embodiment of a communication container is shown.

The communication container 10 includes a body 12, with an internal letter chamber 14. The letter chamber 14 is accessible through the letter chamber opening 16. An optional first seal 18 and second seal 20 close the letter chamber 14, and optionally engage the body 12 using threads 22.

The communication container 10 includes optional text 11, such as a message or identification of the individual giving, or receiving, the communication container 10.

Figure 2:
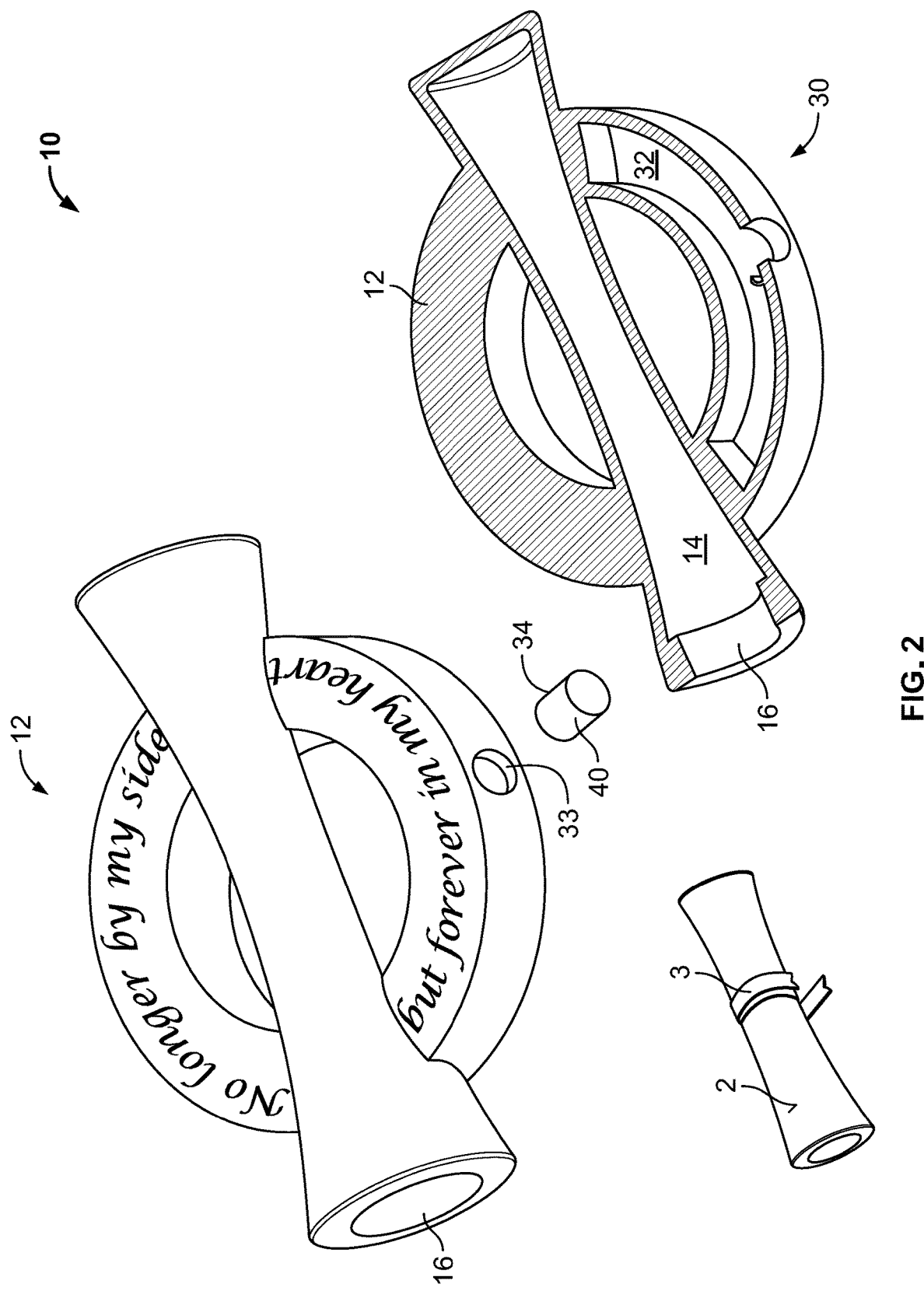
FIG. 2 illustrates an outer and cross-sectional view of a second embodiment of a communication container.

Referring to FIG. 2, an outer and cross-sectional view of a second embodiment of a communication container is shown.

The second embodiment of the communication container 10 again includes a body 12, with an internal letter chamber 14. The letter chamber 14 is accessible through the letter chamber opening 16.

A letter 2 is shown, tied with optional ribbon 3.

An ash compartment 30 includes an ash chamber 32, accessible via an ash chamber opening 33. A seal 34 closes the ash chamber 32, shown here using a plug 40.

Figure 3:
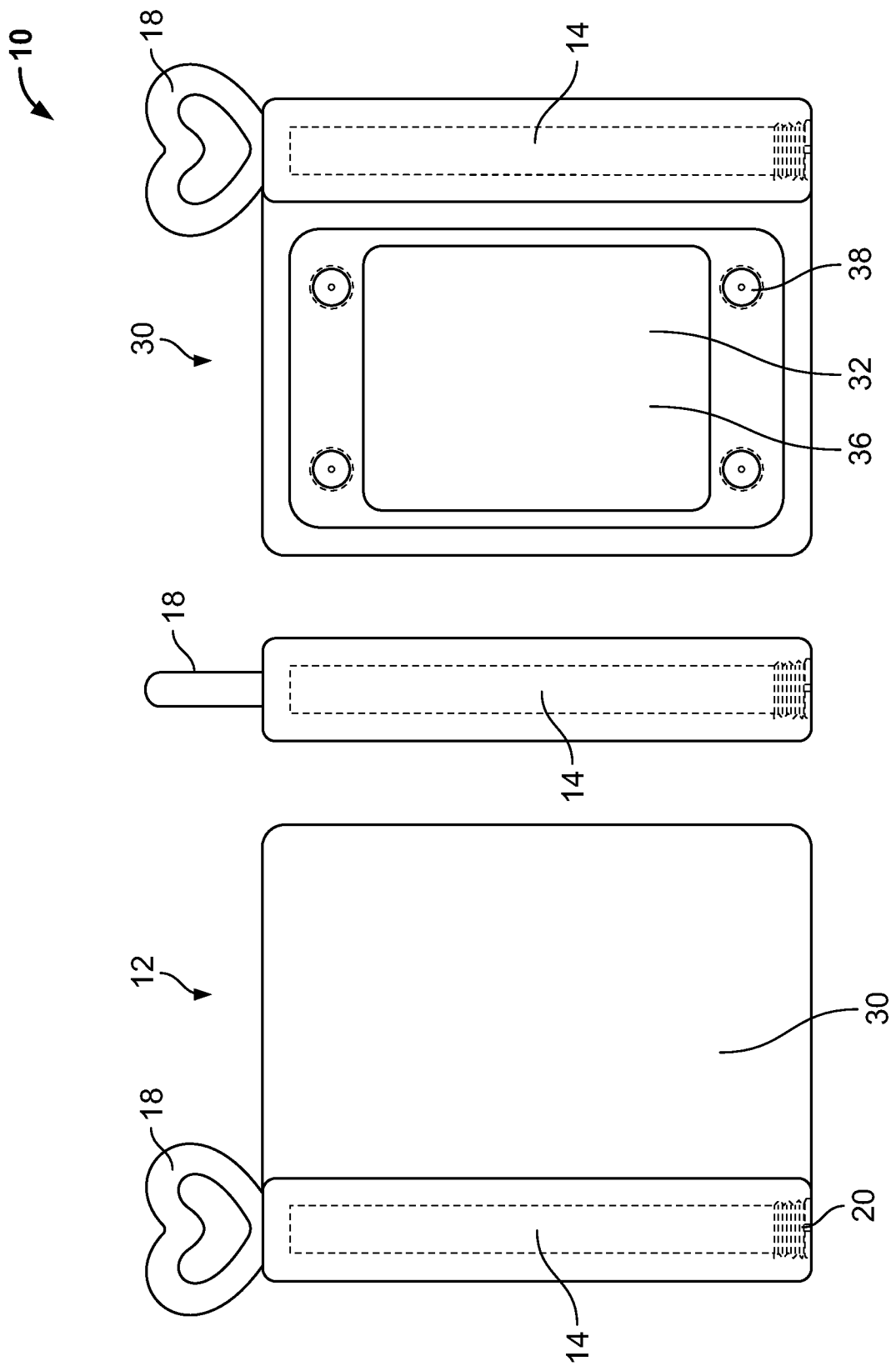
FIG. 3 illustrates an outer and partially-transparent view of a third embodiment of a communication container.

Referring to FIG. 3, an outer and partially-transparent view of a third embodiment of a communication container is shown.

The third embodiment of the communication container 10 again includes a body 12, with an internal letter chamber 14.

The letter chamber 14 is accessible through the letter chamber opening 16 (see FIG. 1), closed using first seal 18 and second seal 20.

An ash compartment 30 includes an ash chamber 32, sealed using a plate 36, held in place by fasteners 38.

Figure 4:
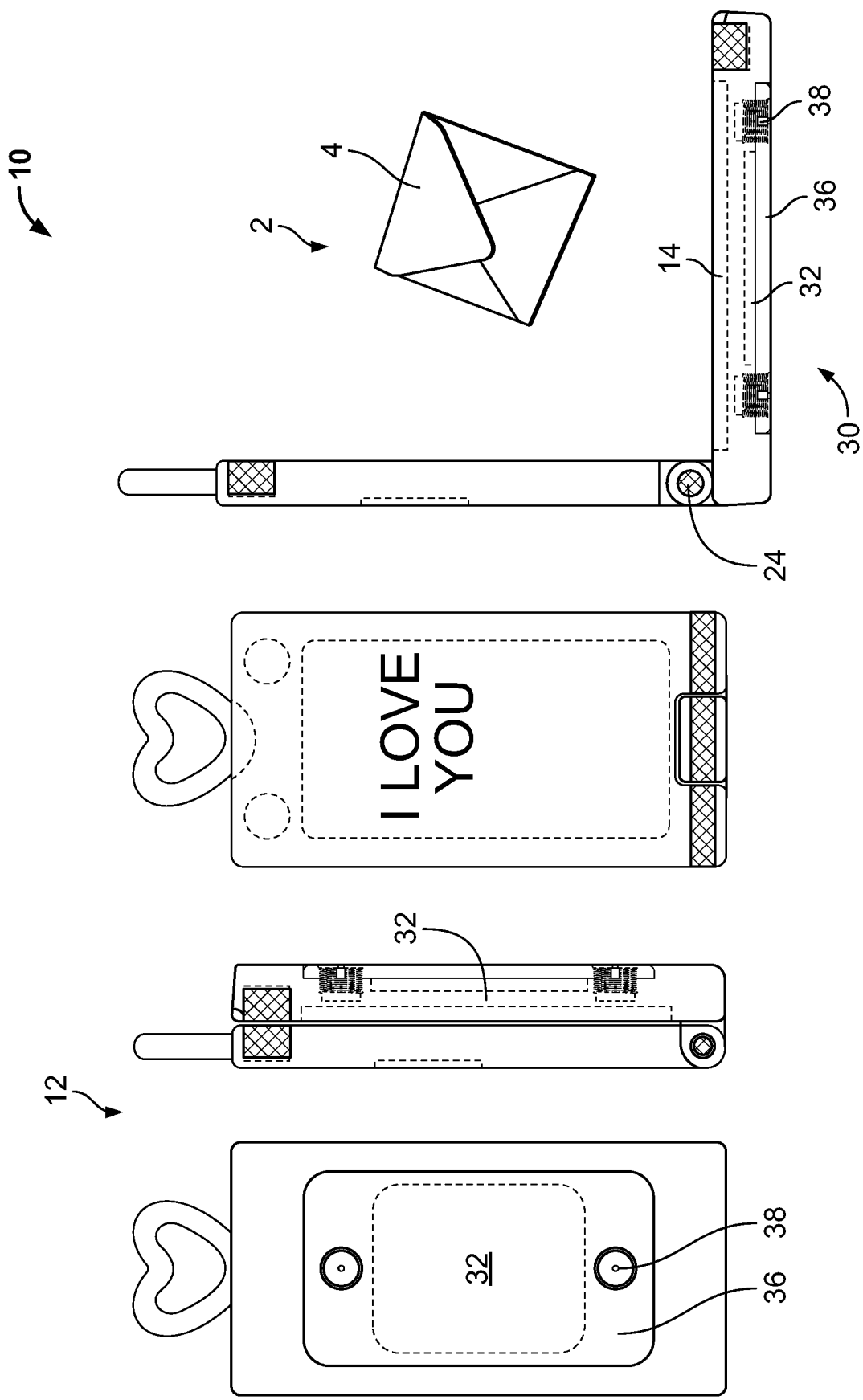
FIG. 4 illustrates an outer and partially-transparent view of a fourth embodiment of a communication container.

Referring to FIG. 4, an outer and partially-transparent view of a fourth embodiment of a communication container is shown.

The fourth embodiment of the communication container 10 again includes a body 12, with an internal letter chamber 14. The letter chamber 14 is accessible using the hinge 24 to open the communication container 10, exposing a recess that forms the internal letter chamber 14.

A letter 2 is shown within an envelope 4 for placement within the letter chamber 14.

An ash compartment 30 includes an ash chamber 32, sealed using a plate 36, held in place by fasteners 38.

Figure 5:
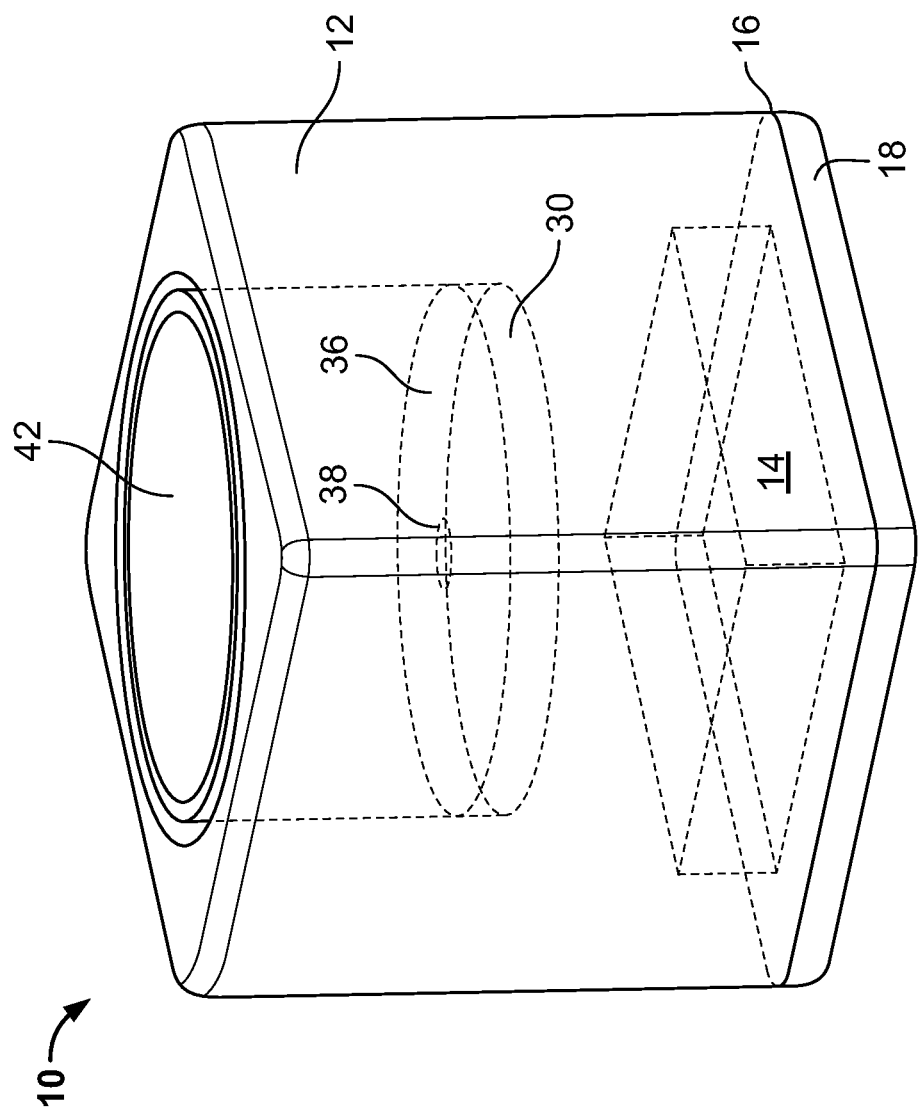
FIG. 5 illustrates a fifth embodiment of a communication container that includes a recess for a candle.

Referring to FIG. 5, a fifth embodiment of a communication container that includes a recess for a candle is shown.

The fourth embodiment of the communication container 10 again includes a body 12, with an internal letter chamber 14. The letter chamber 14 is accessible through letter chamber opening 16, accessible by removing first seal 18. First seal 18 is preferably held to body 12 using magnets (not shown).

The internal letter chamber 14 is larger than in other embodiments, allowing for the use of thicker, or more, paper.

An ash compartment 30 is sealed using a plate 36, held in place by fastener 38.

A candle depression 42 allows for insertion of a candle (not shown) to help the user remember the third-party.

Figure 6:
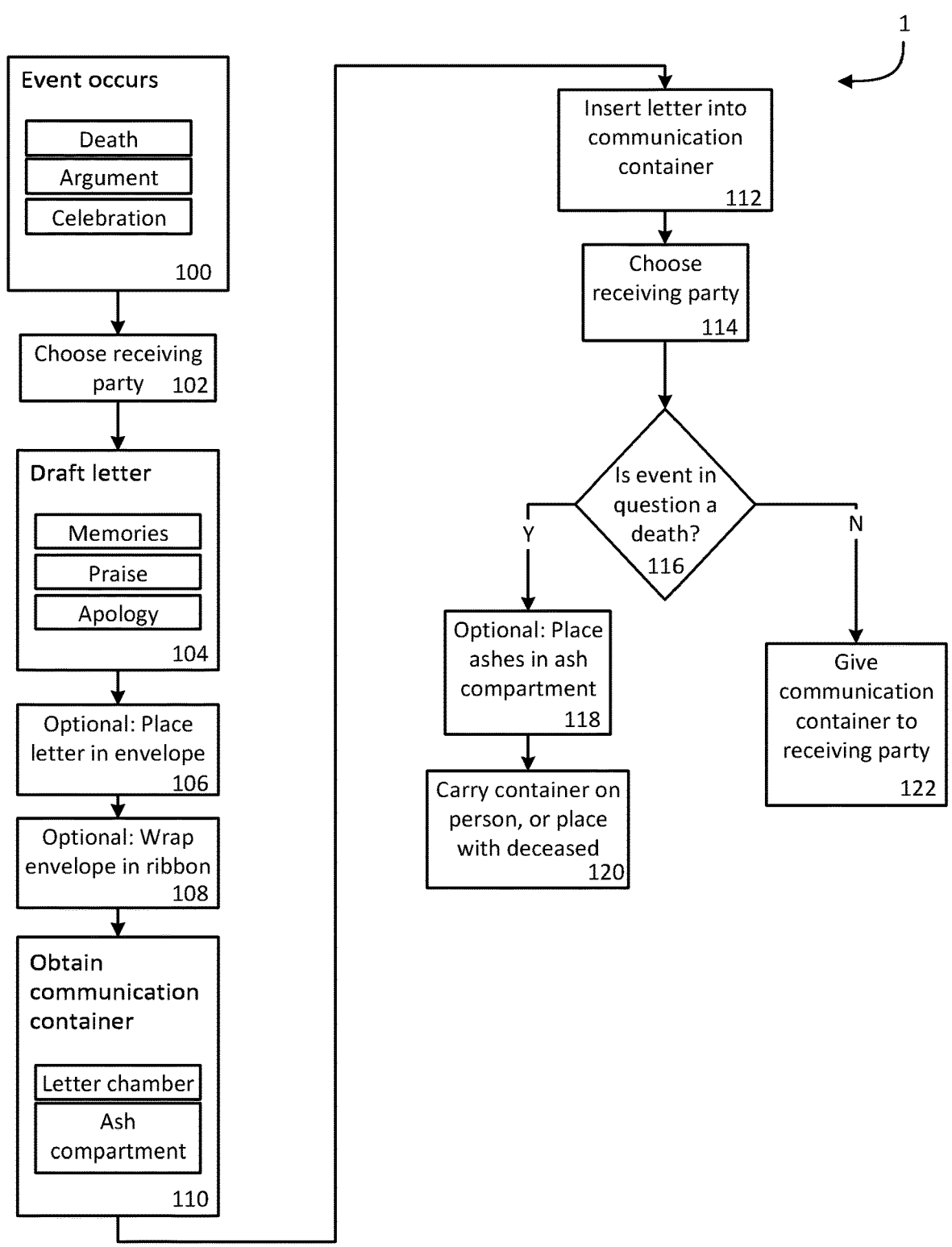
FIG. 6 illustrates the steps of executing the disclosed method.

Referring to FIG. 6, the steps of executing the disclosed method are shown.

The method of the eternity letter communication system 1 is prompted by the occurrence of an event 100. For example, a death, an argument, or a celebration. Upon the occurrence of an event the user chooses a party 102 to receive a letter.

A letter is then drafted 104. The letter preferably includes memories, praise, or an apology.

After drafting, the letter is then optionally folded in place in an envelope 106.

Alternatively, or in addition to placing in an envelope, the letter is wrapped in a ribbon 108.

The user then obtains a communication container 110. The communication container includes a letter chamber and optionally includes an ash compartment.

The user then inserts the letter into the communication container 112.

The user then chooses the receiving party 114.

The determination of the receiving party is affected by whether or not the event in question is a death 116.

If the event is a death the user optionally adds ashes to the ash compartment 118. The user then decides whether to carry the container on her person or to place the container with the deceased third-party 120.

If the event is not a death, the user then gives the communication container to the receiving party the third-party 122.

Figure 7:
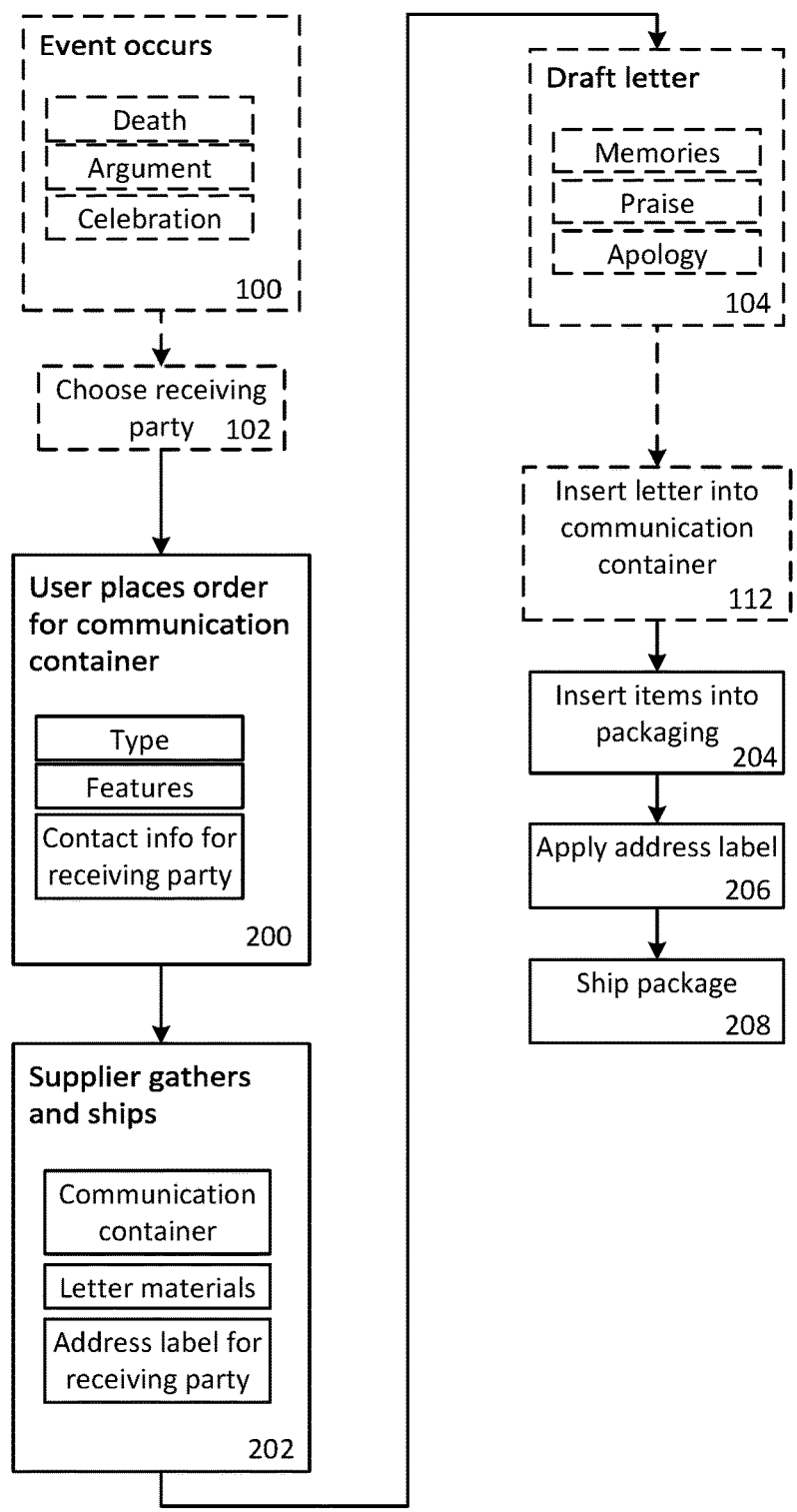
FIG. 7 illustrates optional additional steps of executing the disclosed method.

Referring to FIG. 7, additional optional steps of executing the disclosed method are shown.

Streamlining the process of sending the communication container to the receiving party increases the chances that the user will be able to complete the process and send the letter and communication container.

Following steps of occurrence of an event 100, and choosing a party 102 to receive a letter (see FIG. 6), the user places an order for a communication container 200. The order is likely placed using the Internet, but other means of placing an order are anticipated.

The order includes the type of communication container desired, the communication container features, and contact information for the receiving party.

The supplier then gathers and ships 202 the requested items. Included is; the communication container; letter materials such as paper, ribbon, envelope; and an address label for the receiving party.

The address label may include pre-paid shipping information, avoiding the need for the user pay for shipping later.

Steps 104 of drafting the letter through step 112 of inserting the letter are followed (see FIG. 6), then the user inserts the communication container into the packaging 204, applies the address label 206, and ships the package 208.

This modification of the method disclosed in FIG. 6 eases the process of shipping the communication container by avoiding the need for the user to again locate address information for the receiving party.

Figure 8:
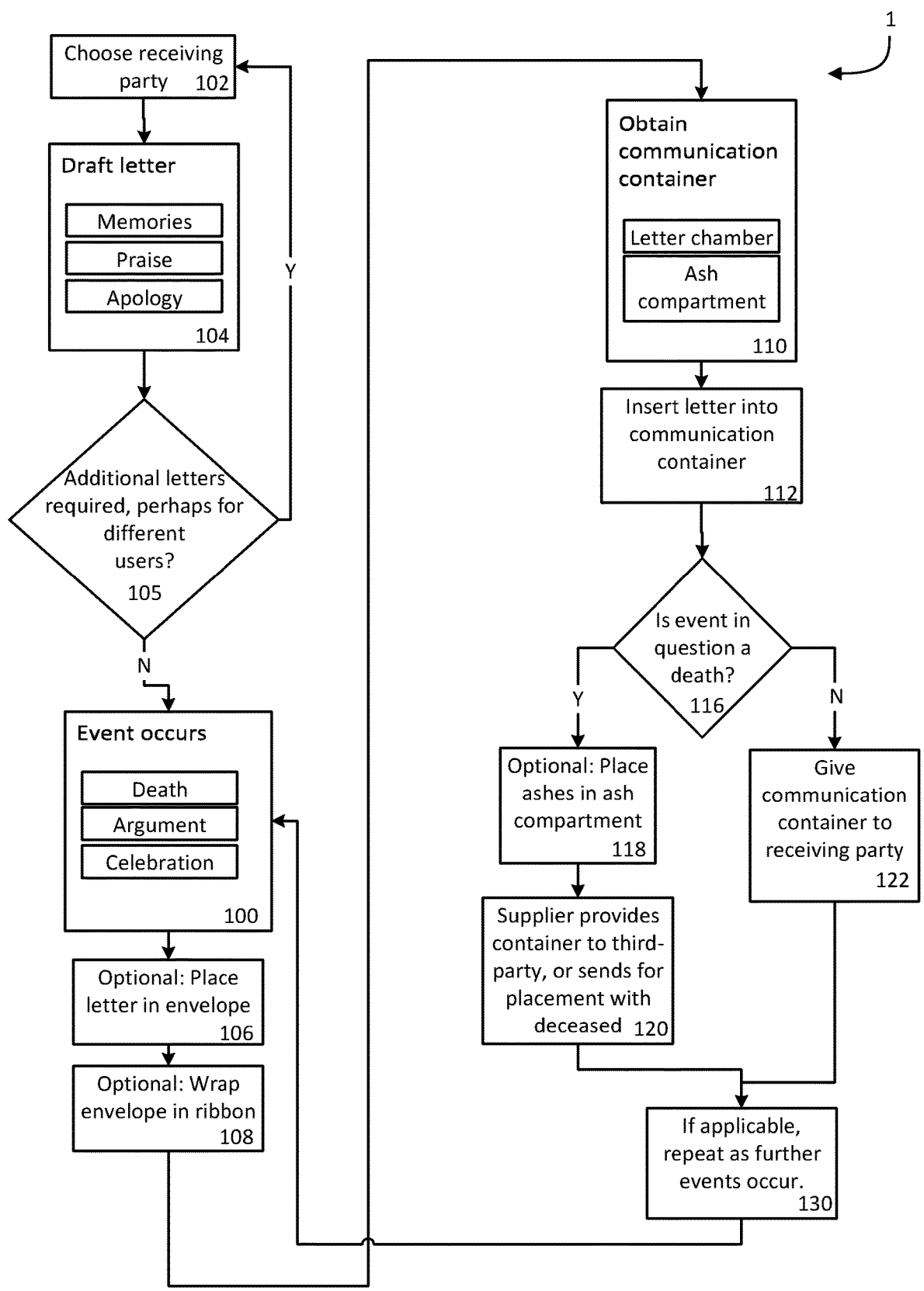
FIG. 8 illustrates a second embodiment of the disclosed method.

Referring to FIG. 8, a second embodiment of the disclosed method is shown.

In this embodiment, the choice of a receiving party 102 and drafting the letter 104 precede the occurrence of the event 100. Choosing receiving parties 102 and drafting letters 104 is repeated as needed 105 depending upon whether the same letter is used for multiple receiving parties, or whether multiple letters are used.

Upon occurrence of an event 100, such as a death or a celebration, the letter is then optionally folded in place in an envelope 106 by the user or a supplier.

Alternatively, or in addition to placing in an envelope, the letter is wrapped in a ribbon 108 by the user or a supplier.

The supplier then obtains a communication container 110. The communication container includes a letter chamber and optionally includes an ash compartment.

The supplier then inserts the letter into the communication container 112.

The determination of the receiving party is affected by whether or not the invent in question is a death 116.

If the event is a death the supplier optionally adds ashes to the ash compartment 118. The supplier can then either send the container to a third-party place the container with the deceased third-party 120.

If the event is not a death the supplier then provides the communication container to the receiving party, or third-party, 122.

These steps following the occurrence of an event 100 may be repeated 130 as needed, if additional letters exist.

Figure 9:
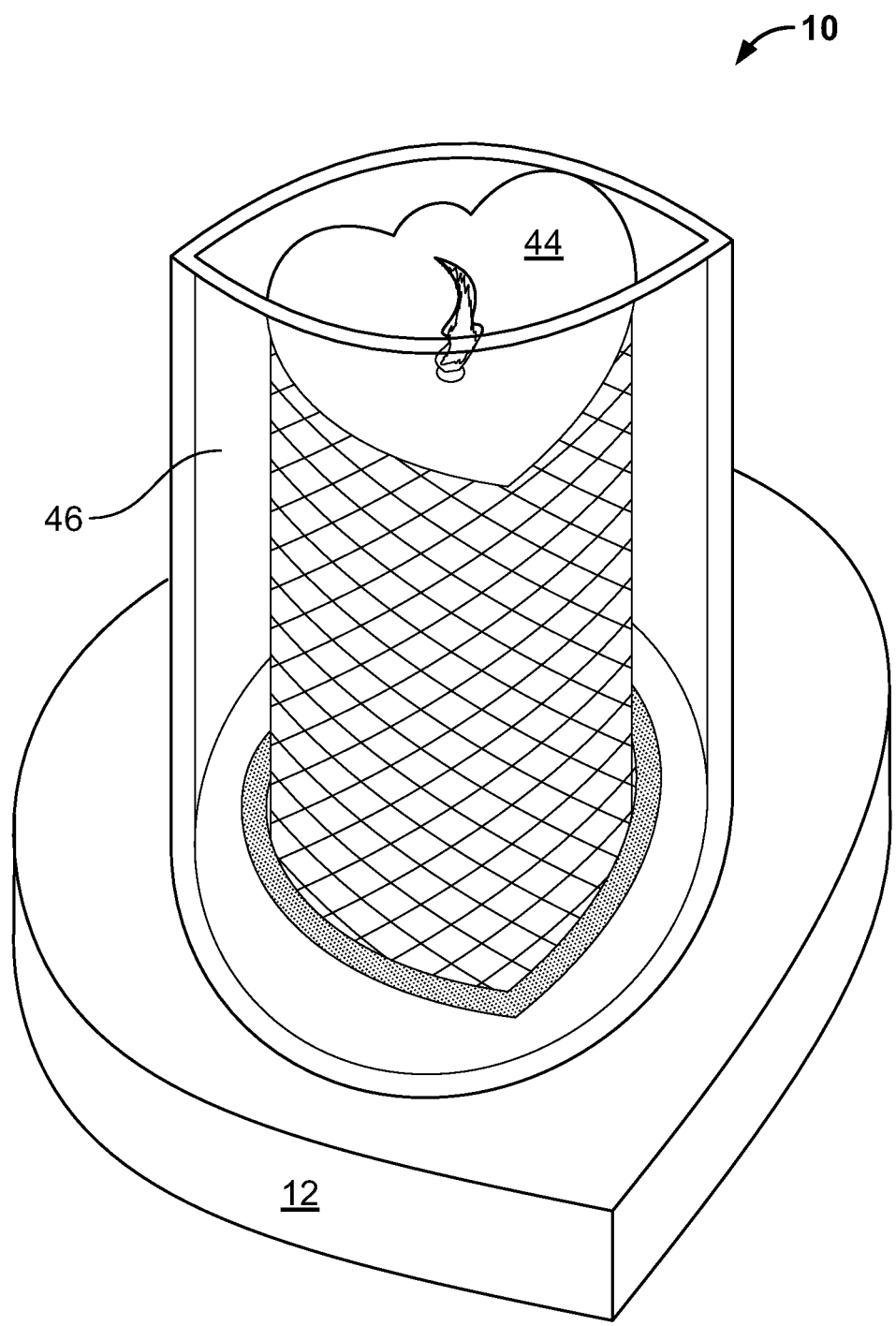
FIG. 9 illustrates a communication container with candle.

FIG. 9 illustrates a communication container with candle.

The communication container 10 includes a body 12 with candle 44, the candle 44 surrounded by a glass surround 46. The glass surround 46 can be of many different styles, including tinted, frosted, and so forth.

Figure 10:
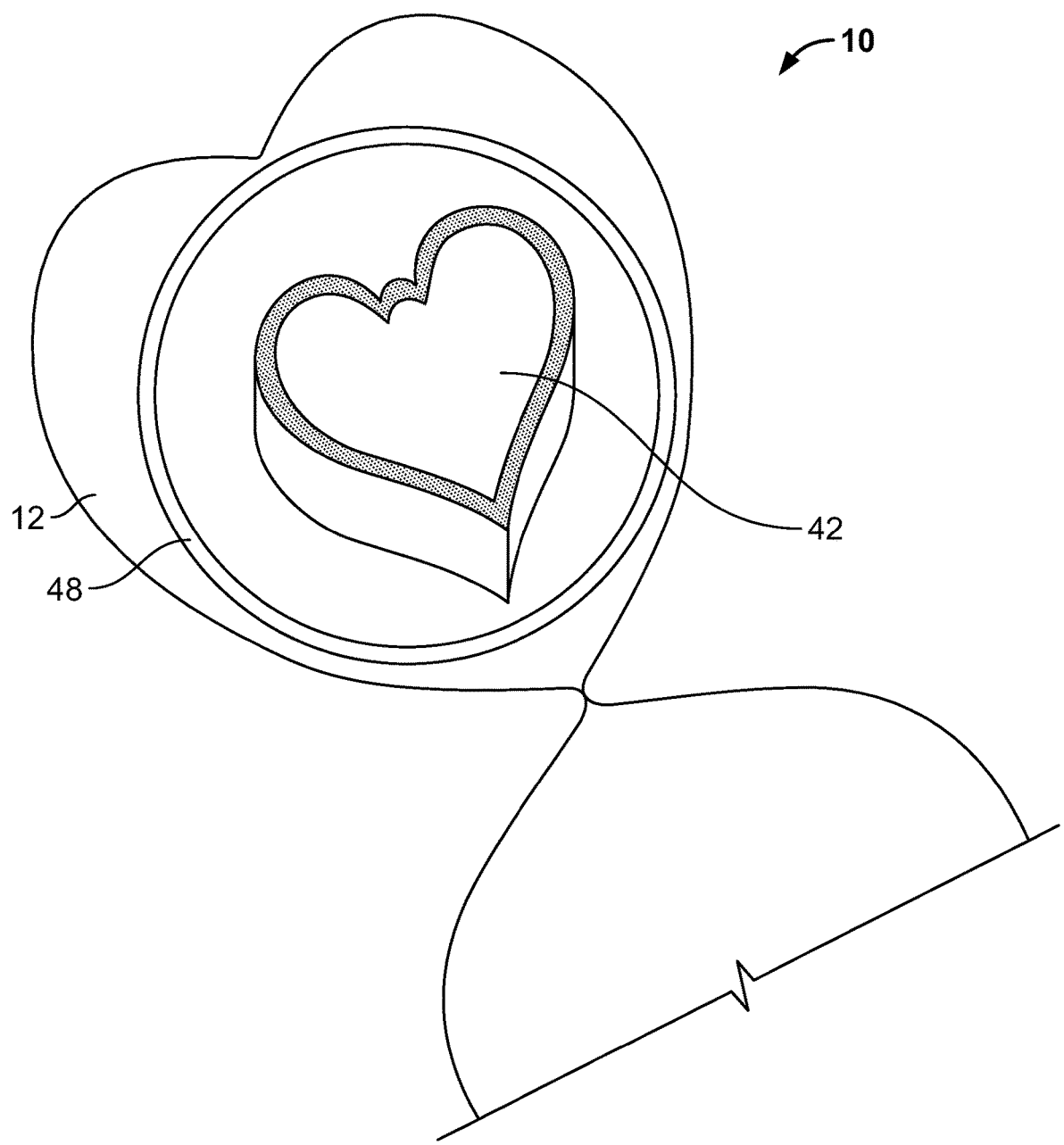
FIG. 10 illustrates a communication container with candle, the candle removed.

FIG. 10 illustrates a communication container with candle, the candle removed.

The communication container 10 is shown without candle 44 (see FIG. 9), the body 12 including a candle depression 42. The body 12 of the communication container 10 meets with a second optional body 12, forming a heart-shaped infinity symbol.

A glass surround recess 48 holds the glass surround 44 (see FIG. 9) in a precise position with respect to the candle 44.

Figure 11:
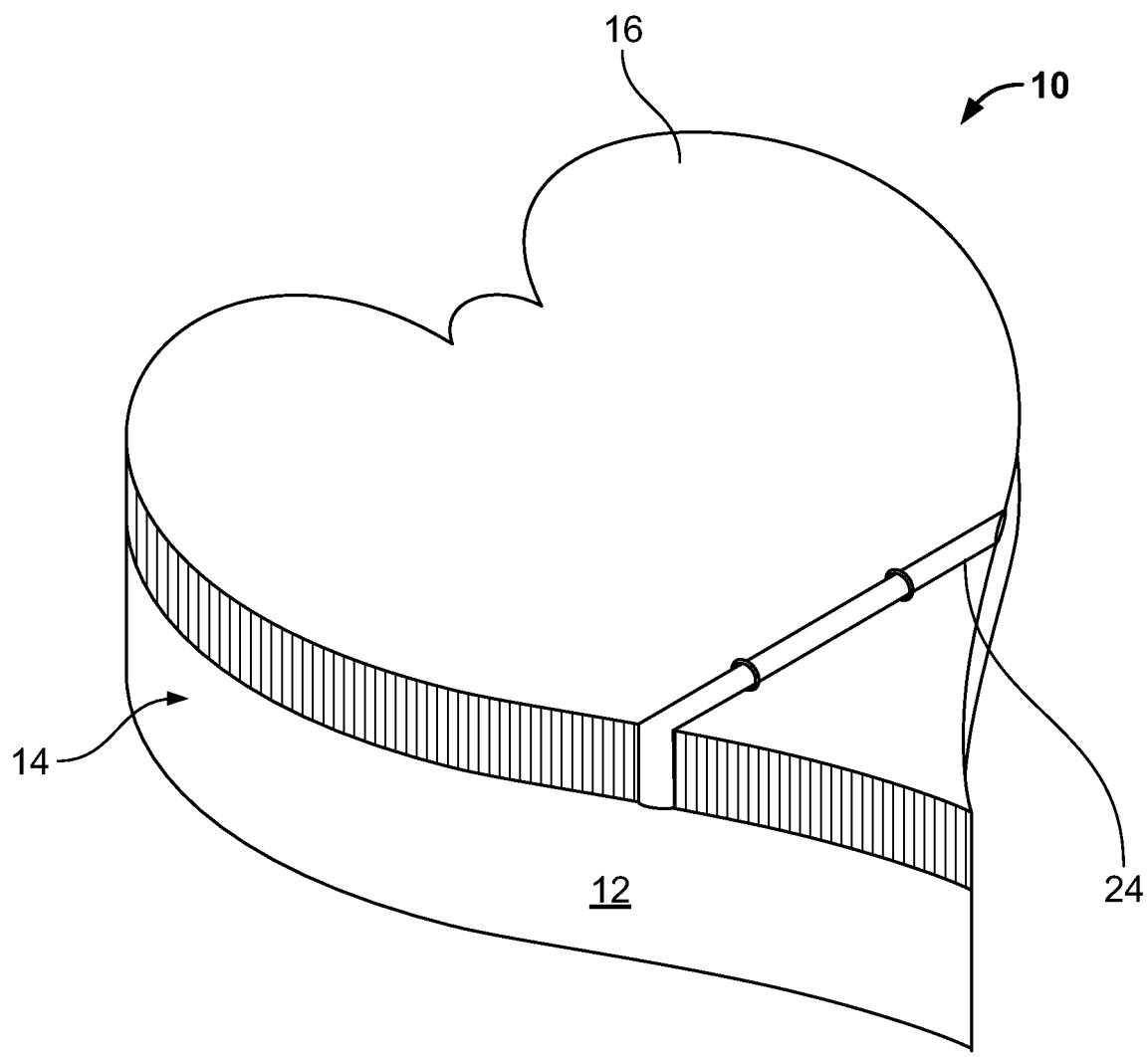
FIG. 11 illustrates a view of the bottom of a communication container with candle.

FIG. 11 illustrates a view of the bottom of a communication container with candle.

Viewing the bottom of the communication container 10, the body 12 includes an internal letter chamber 14 accessible by way of a letter chamber opening 16, accessible by a hinge 24. Ashes are optionally stored within the letter chamber 14 in addition to a letter.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for communicating between a user and a third-party, the method comprising the steps of:
   prior to an event, the user places an order for a letter from a supplier;
   the supplier gathers and ships the letter to the user;
   after receiving the letter, the user writes a message on the letter to the third-party;
   the letter being a physical medium;
   the user returns the letter to the supplier;
   the supplier waits for the event to occur;
   the supplier obtains a communication container;
   the communication container includes:
   a body;
   a letter chamber within the body;
   the letter chamber shaped to hold the letter which is a rolled or folded letter;
   after obtaining the communication container, the supplier inserts the letter into the letter chamber of the communication container;
   after inserting the letter, the supplier transfers the communication container to the third-party;
   whereby the user can achieve lasting communication with the third-party, even though such communication may otherwise be impeded by death or hesitance to have a difficult conversation.

2. The method of claim 1, the communication container further comprising:
   an ash compartment;
   the ash compartment including an ash chamber that is accessible by way of a removable seal;
   whereby the ash compartment allows the third-party to hold ashes of the user.

3. The method of claim 2, wherein the method comprises the following step performed by the supplier between inserting the letter into the letter chamber and transferring the communication container:
   removing the removable seal of the ash compartment;
   inserting ashes of the user into the ash compartment; and
   replacing the removable seal of the ash compartment.

4. The method of claim 1, wherein the event is a birthday of the third-party.

5. The method of claim 1, wherein the event is a death of the user.

6. The method of claim 1, wherein the message is comprised of memories, praise, or an apology.

7. The method of claim 1, the communication container further comprising:
- a first seal;
  - the first seal closing an opening to the letter chamber;
  - whereby the supplier removes the first seal, inserts the letter into the letter chamber, and then closes the first seal.

8. A method that allows a user to share a memory, praise, or apology with a third-party by allowing the user to encapsulate the memory, praise, or apology in physical form to create an encapsulated memory, praise, or apology, storing the encapsulated memory, praise, or apology in a communication container, a supplier holding the communication container or transferring the communication container to the third-party party, thereby allowing the user to let go of the memory, praise, or apology, the method comprising:
- prior to occurrence of an event, the user writes a letter;
  - the letter contains the memory, praise, or apology;
  - the letter written on a piece of paper;
- after writing the letter, the supplier obtains the communication container;
  - the communication container is ornamental and intended to displayed by the user, by the third-party, or near the third-party;
  - the communication container includes a letter chamber to contain the letter;
  - the letter chamber sealing using a first seal that interfaces with a letter chamber opening;
- an ash compartment within the communication container;
  - the ash compartment including an ash chamber that is accessible by way of a removable seal;
- after obtaining the communication container, the supplier inserts the letter into the letter chamber of the communication container;
- after inserting the letter into the letter chamber, the supplier seals the letter chamber by inserting the first seal into the letter chamber opening;
- removing the removable seal of the ash compartment;
- inserting ashes of the third-party into the ash compartment; and
- replacing the removable seal of the ash compartment;
- waiting until the event occurs;
- after the event occurs, the supplier transfers the communication container to the third-party;
- whereby the user is able to transfer the memory, apology, or praise to the third-party, thus allowing the user to communicate with the third-party even after the death of the user.

* * * * *